(12) United States Patent
Seitz

(10) Patent No.: US 10,592,553 B1
(45) Date of Patent: Mar. 17, 2020

(54) INTERNET VIDEO CHANNEL

(71) Applicant: Michael W. Seitz, Houston, TX (US)

(72) Inventor: Michael W. Seitz, Houston, TX (US)

(*) Notice: Subject to any disclaimer, the term of this patent is extended or adjusted under 35 U.S.C. 154(b) by 338 days.

(21) Appl. No.: 15/666,746

(22) Filed: Aug. 2, 2017

(51) Int. Cl.
| | |
|---|---|
| *G06F 16/00* | (2019.01) |
| *G06F 16/78* | (2019.01) |
| *H04N 21/4782* | (2011.01) |
| *H04N 21/8405* | (2011.01) |
| *H04N 21/61* | (2011.01) |
| *H04N 21/482* | (2011.01) |
| *H04N 21/454* | (2011.01) |
| *H04N 21/45* | (2011.01) |
| *G06F 16/74* | (2019.01) |
| *G06F 16/9535* | (2019.01) |

(52) U.S. Cl.
CPC ........ *G06F 16/7867* (2019.01); *G06F 16/743* (2019.01); *G06F 16/9535* (2019.01); *H04N 21/454* (2013.01); *H04N 21/4532* (2013.01); *H04N 21/4782* (2013.01); *H04N 21/482* (2013.01); *H04N 21/6125* (2013.01); *H04N 21/8405* (2013.01)

(58) Field of Classification Search
CPC ............... G06F 16/7867; G06F 16/743; G06F 16/9535; H04N 21/4532; H04N 21/454; H04N 21/4782; H04N 21/482; H04N 21/6125; H04N 21/8405
USPC ........................................................ 707/706
See application file for complete search history.

(56) References Cited

U.S. PATENT DOCUMENTS

| | | | | |
|---|---|---|---|---|
| 6,862,611 | B1* | 3/2005 | Marics ................. | H04N 7/084 348/478 |
| 7,155,451 | B1* | 12/2006 | Torres ................. | G06F 16/9535 |
| 8,965,932 | B2* | 2/2015 | Torres ................. | G06F 16/954 707/795 |
| 9,454,581 | B1* | 9/2016 | Garg ..................... | G06F 16/951 |
| 2001/0049826 | A1* | 12/2001 | Wilf ....................... | H04N 5/50 725/120 |
| 2007/0067297 | A1* | 3/2007 | Kublickis .............. | G06Q 30/02 |
| 2008/0046916 | A1* | 2/2008 | Shivaji-Rao ........ | H04N 7/17318 725/25 |
| 2009/0325602 | A1* | 12/2009 | Higgins ................ | H04W 4/023 455/456.2 |
| 2010/0125563 | A1* | 5/2010 | Nair ...................... | G06O 30/02 707/709 |
| 2010/0125604 | A1* | 5/2010 | Martinez ............. | G06F 16/9535 707/784 |

(Continued)

*Primary Examiner* — Hanh B Thai
(74) *Attorney, Agent, or Firm* — John R. Casperson

(57) ABSTRACT

A method for receiving video information from the internet is carried out on a digital computer having a user interface, memory, a processor, internet access and software necessary for operability. There is displayed on the user interface a menu listing a plurality of categories of videos accessible to the computer using the internet access. Upon selection by a user of a category of videos from the menu, a web search engine is queried for a list of video web page locations within the selected category. The list is received at the digital computer by way of the internet access. The list is formed into a queue for retrieving playing the associated videos. The associated image and audio data for the videos in the queue is received by the computer using the internet access. The videos are played automatically in the sequence in which they are queued up unless the user intervenes or the list is updated.

18 Claims, 7 Drawing Sheets

(56) References Cited

U.S. PATENT DOCUMENTS

| | | | | |
|---|---|---|---|---|
| 2010/0125605 A1* | 5/2010 | Nair | H04L 63/102 |
| | | | 707/784 |
| 2010/0306249 A1* | 12/2010 | Hill | G06Q 30/02 |
| | | | 707/769 |
| 2010/0306644 A1* | 12/2010 | Underwood | G06Q 10/10 |
| | | | 715/234 |
| 2013/0110978 A1* | 5/2013 | Gordon | H04N 21/2665 |
| | | | 709/218 |
| 2013/0218905 A1* | 8/2013 | Sankarasubramaniam | |
| | | | H04N 21/4532 |
| | | | 707/748 |
| 2014/0096162 A1* | 4/2014 | Casey | H04N 21/233 |
| | | | 725/61 |
| 2016/0350836 A1* | 12/2016 | Burns | G06Q 30/0625 |
| 2017/0024478 A1* | 1/2017 | Garg | G06F 16/951 |
| 2018/0095944 A1* | 4/2018 | Akkarawittayapoom | |
| | | | H04L 67/306 |
| 2018/0107741 A1* | 4/2018 | Kapoor | G06F 16/9535 |

\* cited by examiner

INTERNET VIDEO CHANNEL

FIELD OF THE INVENTION

In certain aspects, this invention relates to an internet video channel. In certain other aspects, this invention relates to identifying a plurality of related video presentations indexed by their metadata and available from the internet and playing them one after another on a user device. In certain other aspects, the invention relates to an agglomerator for related video clips that has a feedback loop to refine future selections.

BACKGROUND OF THE INVENTION

Information presented by video can be noticed while the viewer/listener is doing other things. However, there doesn't currently exist a system that retrieves multiple information items sorted by subject matter topics and/or key words that have been selected by the user and automatically opens and presents them without further interaction from the user, since currently a topic or key word search in systems and programs provides significant content, but the user is required to separately initiate the playing of each such item to receive the content.

The closest currently available example of short story video agglomerations is 24 hour news channels. However, even in their case, one channel may scoop another on breaking news, or content may cover topics that are not tailored to a person's interests. A personalized channel that plays the latest news stories that are specifically focused on the viewer's interests from a range of channels automatically would be very desirable.

In the financial word, an agglomerator that collects and plays related financial news stories on a particular company, county, or commodity, for example, would be very desirable.

In music entertainment, videos that focus only on a user's preferences such as specific artists, a music type, or era, could provide an entertaining viewing for relaxation or parties.

In adult television, a system that automatically searches out on the world wide web and automatically plays a series of videos ordered by a set of user preferences would be much sought after.

In education, an educator could develop a channel of interesting topics that could provide students with entertaining lineups. For example, a history channel that has topics selected on specific subject matter pertinent to a curriculum could provide a useful subject stimulator.

To sports enthusiasts, video footage of less common sports could be configured, providing individuals the opportunity to create programs similar to the channels that are currently available in some of the more popular sports and offered as channels on large networks, for example.

OBJECTS OF THE INVENTION

It is an object of this invention to provide a system and method for creating a personalized internet-sourced TV channel that searches and automatically plays a queue of videos that meet user-specified parameters.

It is another object of this invention to enable a user to enter a topic of interest to create their own topical TV channel.

It is another object of this invention to enable a user to create a breaking news channel on a topic of their choosing.

It is another object of this invention to create educational channels, for which the world wide web is searched for content related to desired topics and the identified items are queued up and displayed as a continuous channel.

It is another object of this invention to provide a platform for specialized pay-for-content providers over the world wide web to offer their clients a platform to create their own tailored channels using their content, with the content providers having the opportunity to charge associated fees for content.

It is another object of this invention to create music related video channels.

It is another object of this invention to create entertainment channels ranging from trivia to comedy channels, from technology channels to teenager related video footage sharing.

It is a further object of this invention to enable a user to create their own Smartphone or Tablet channel to continuously play videos without further user interaction on a topic of their choosing.

It is another object of this invention to use the Smartphone or Tablet to act as a source for further relaying the image, via systems such as airplay, to a large visual device, for example, a TV or projection TV system.

It is a further object of this invention to provide a video delivery system that, over time, refines its delivery choices for increased relevancy to the user in a minimally interactive way.

SUMMARY OF THE INVENTION

The method of the invention is carried out on a digital computer having a user interface, memory, a processor, internet access and software necessary for operability. There is displayed on the user interface a menu listing a plurality of categories of videos accessible to the computer using the internet access. Upon selection by a user of a category of videos from the menu, a web search engine, or, in a more refined source search, a search engine operating within a specified source provider's domain, is queried for a list of video web page locations within the selected category. The list is received at the digital computer by way of the internet access. The list filtered and organized by programmatic procedures to create an optimized queue for playing the associated videos. The associated image and audio data for the videos in the queue is received by the computer using the internet access. The videos are played at least partway through using the digital computer in the sequence in which they are queued up.

A queue of videos may also be downloaded and saved to the device for later viewing off line.

DETAILED DESCRIPTION OF THE INVENTION

One embodiment of the invention provides a method for receiving video information from the internet. The method is carried out on a digital computer having a user interface, memory, a processor, internet access and software necessary for operability. There is displayed on the user interface a menu listing a plurality of categories of videos accessible to the computer using the internet access. See FIG. 1. Upon selection by a user of a category of videos from the menu, a web search engine is queried for a list of video web page locations within the selected category. The list is received at the digital computer by way of the internet access. The list is formed into a queue for playing the associated videos. The associated image and audio data for the videos in the queue is received by the computer using the internet access. The videos are played at least partway through using the digital computer in the sequence in which they are queued up.

Figure 1:
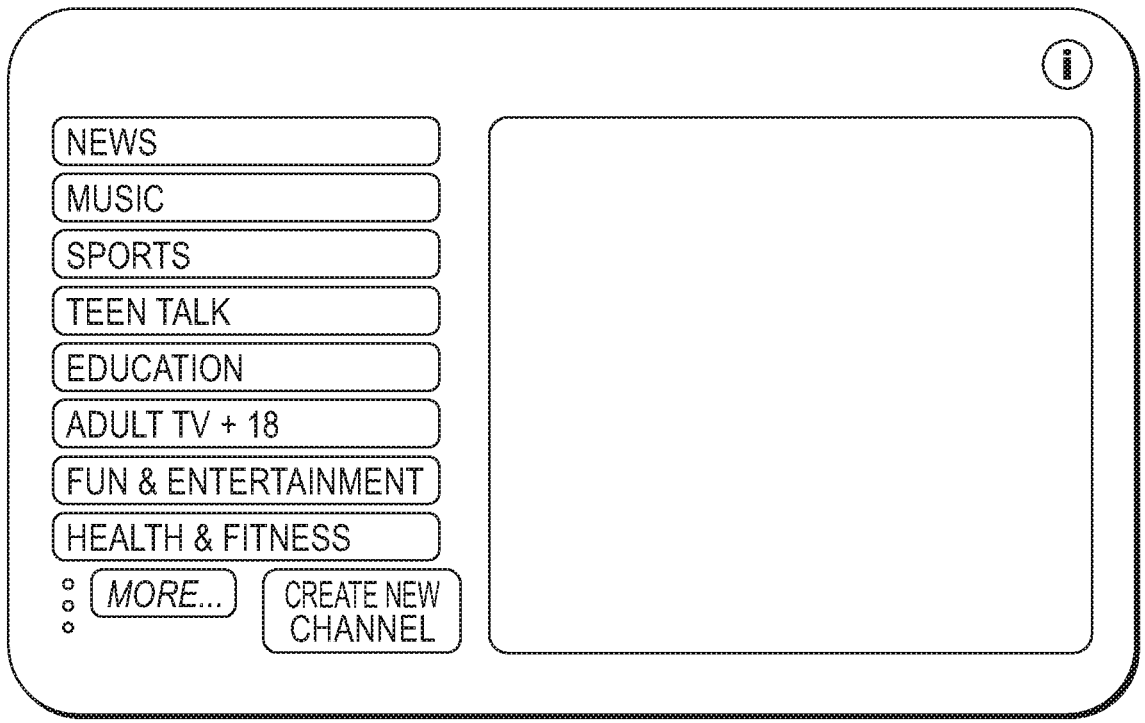
FIG. 1 shows a menu appearing on a screen for making video selections.

The plurality of categories is preferably arranged by subject matter. In FIG. 1, the illustrative categories are New, Music, Sports, Teen Talk, Education, Adult +18 TV, Fun and Entertainment, Health and Fitness. An additional hot button, "More" opens additional subject matters. As an objective of the invention is to create a personalized channel that plays without further interaction, a button is provided to "Create New Channel".

The videos can be played on the user interface, and can be in the form of streaming video. Playing the videos on desk computers, laptop computers, tablets and smartphones is contemplated. If desired, the image and audio data for the videos can be transmitted from the digital computer to a digital media player, such as a Smart-TV, and the videos played on the digital media player. The order of the videos in the queue can be based partly on date and time.

Figure 2:
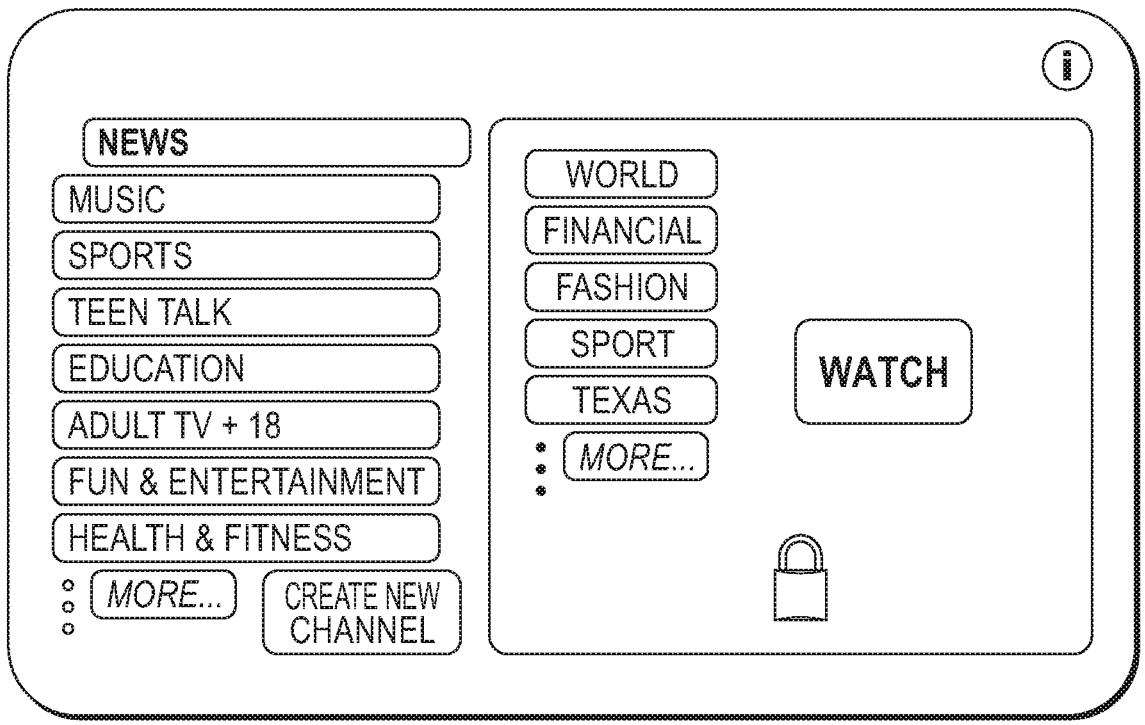
FIG. 2 shows a second menu that appears on the screen when the "News" button is selected on FIG. 1.

In a preferred embodiment, upon selection by a user of a category of videos from the menu, a second menu is displayed on the user interface listing a plurality of subcategories for the selected category of videos accessible to the computer using the internet access. By way of example, as illustrated in FIG. 2, for "News", additional subcategories, "World" "Financial" "Fashion" "Sport" and "Texas" are listed. An optional additional hot button, "More", can be provided to open additional subcategories. A keyword field "Add Keyword" with a lock signal, can be used to further limit return by Keyword, for a charge. It is also contemplated making a charge for adding channels beyond a certain number, or providing access to certain sources. One-time charges would be easiest to administer. Upon selection by a user of a subcategory of videos from the menu, by selecting the subcategory and selecting "Watch" for example, a web search engine is queried for a list of video web page locations that meet the specified criteria. The list is retrieved, formed into a play queue, and the image and audio data are received, and the videos are played at least partway through using the digital computer in the sequence in which they are queued up.

Figure 3:
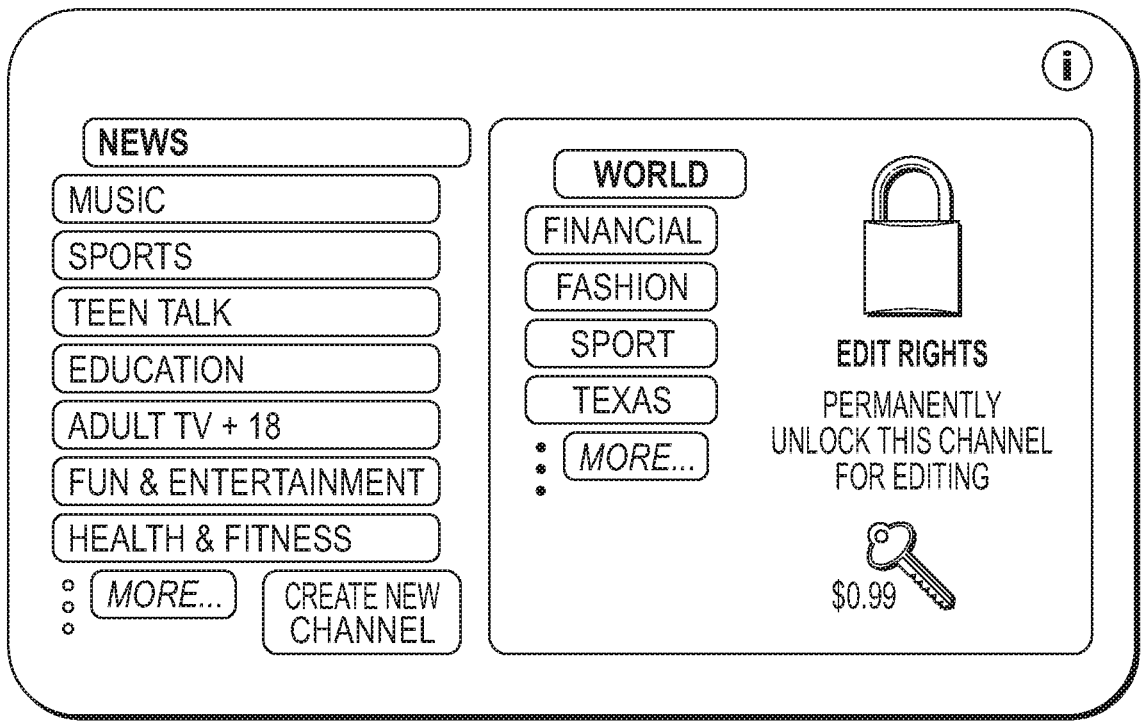
FIG. 3 shows an "Unlock" image that appears on the screen when the "World" button on FIG. 2 is selected.

FIG. 3 illustrates a screen that unlocks the system for editing purposes, for example, by specifying key words, for a fee.

Figure 4:
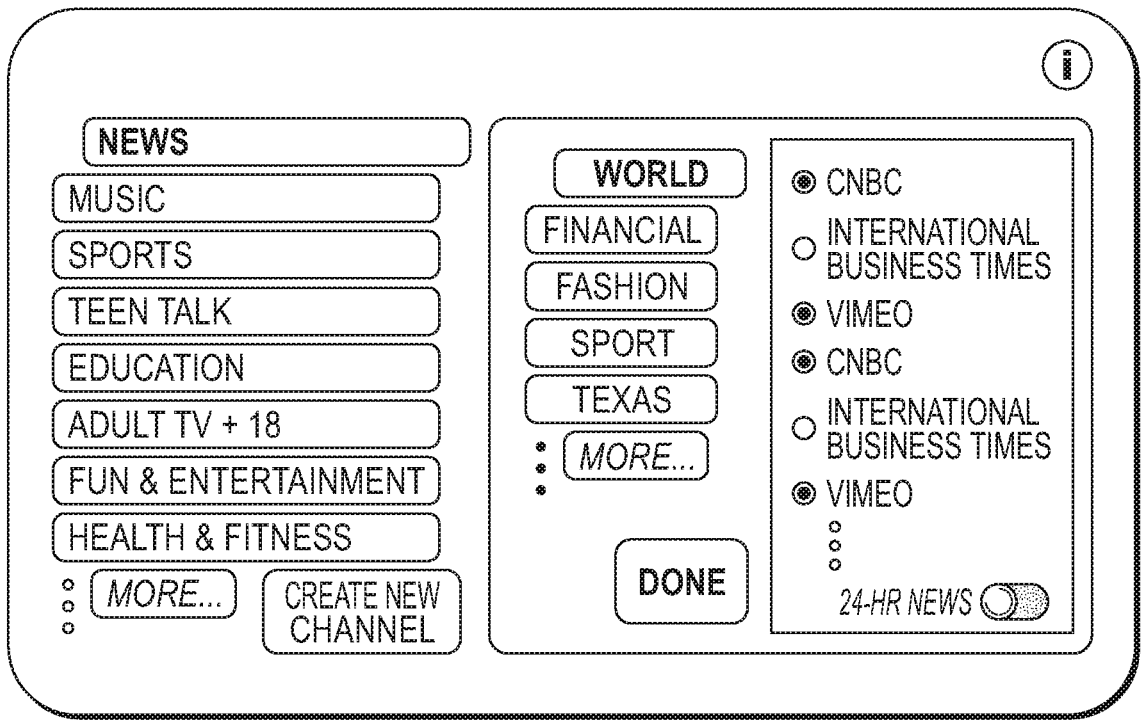
FIG. 4 shows a third menu that appears on the screen when the "Unlock" option has been selected on FIG. 3.
Figure 5:
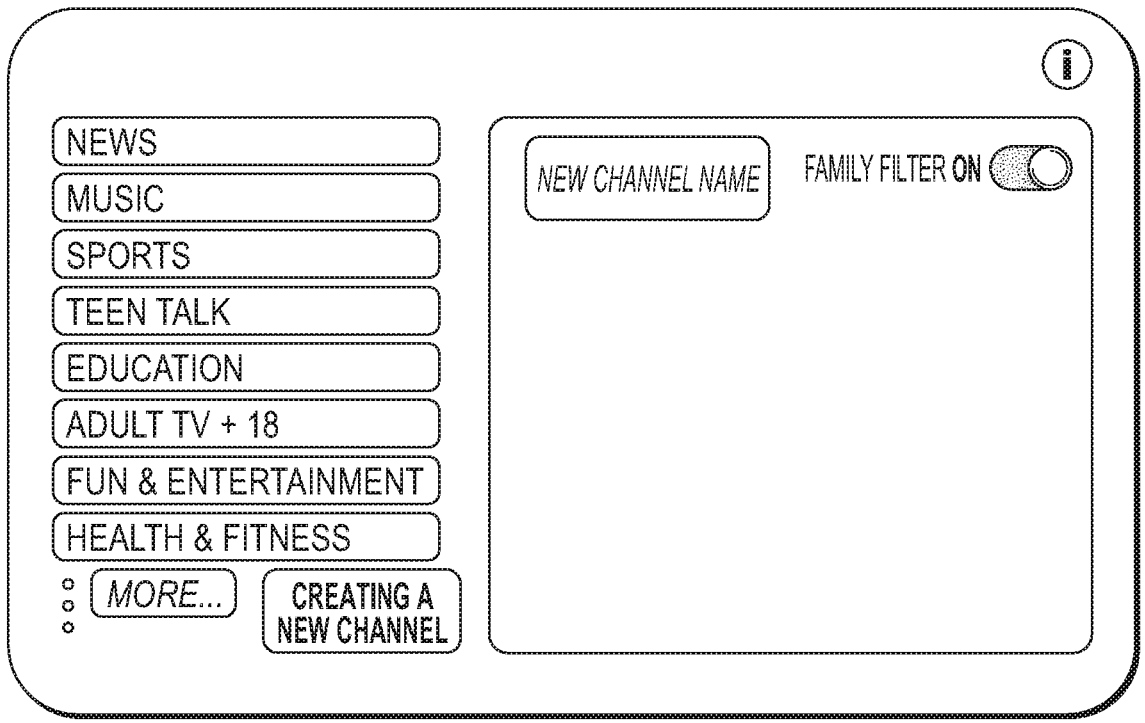
FIG. 5 shows an image that appears when the "Done" button in FIG. 4 has been selected.
Figure 6:
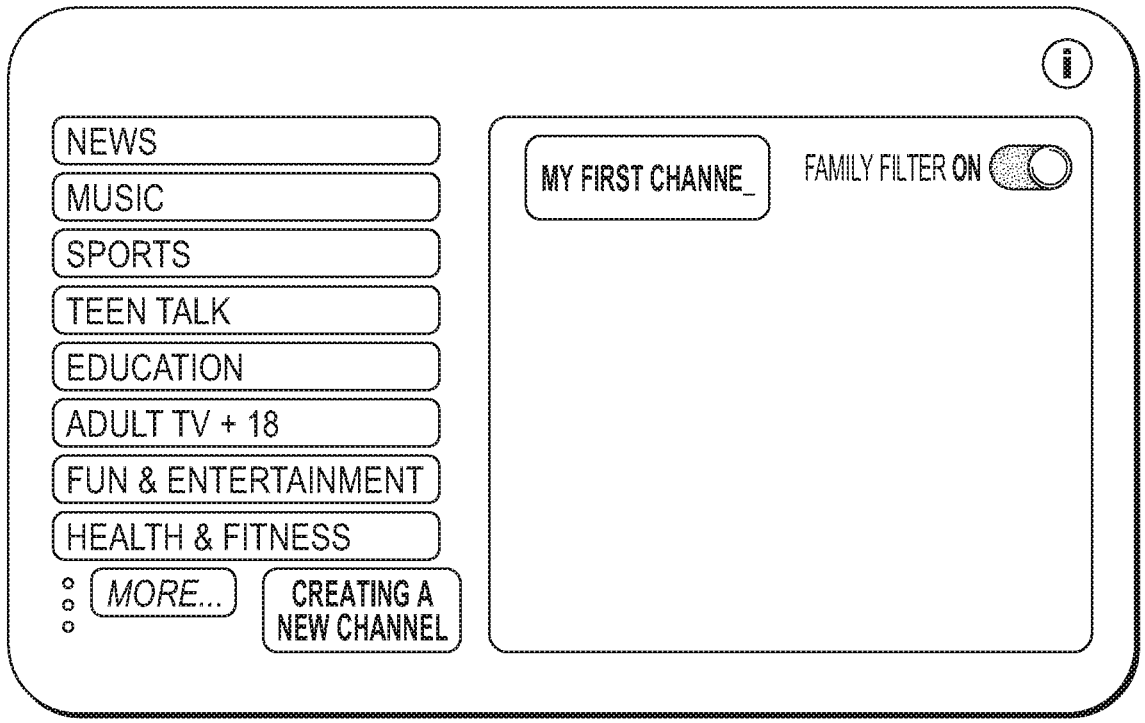
FIG. 6 illustrates filling the "New channel name" field in FIG. 5.
Figure 7:
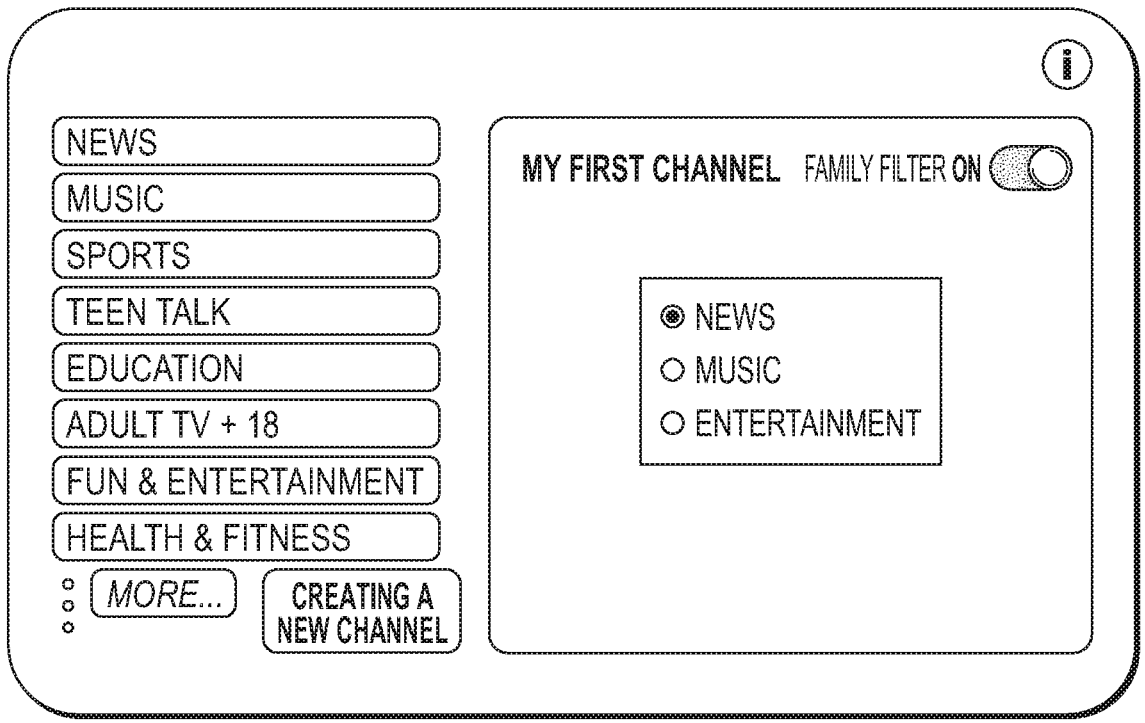
FIG. 7 shows an additional parameter menu that appears on the screen once the "New channel name" field shown in FIG. 6 has been completed.
Figure 8:
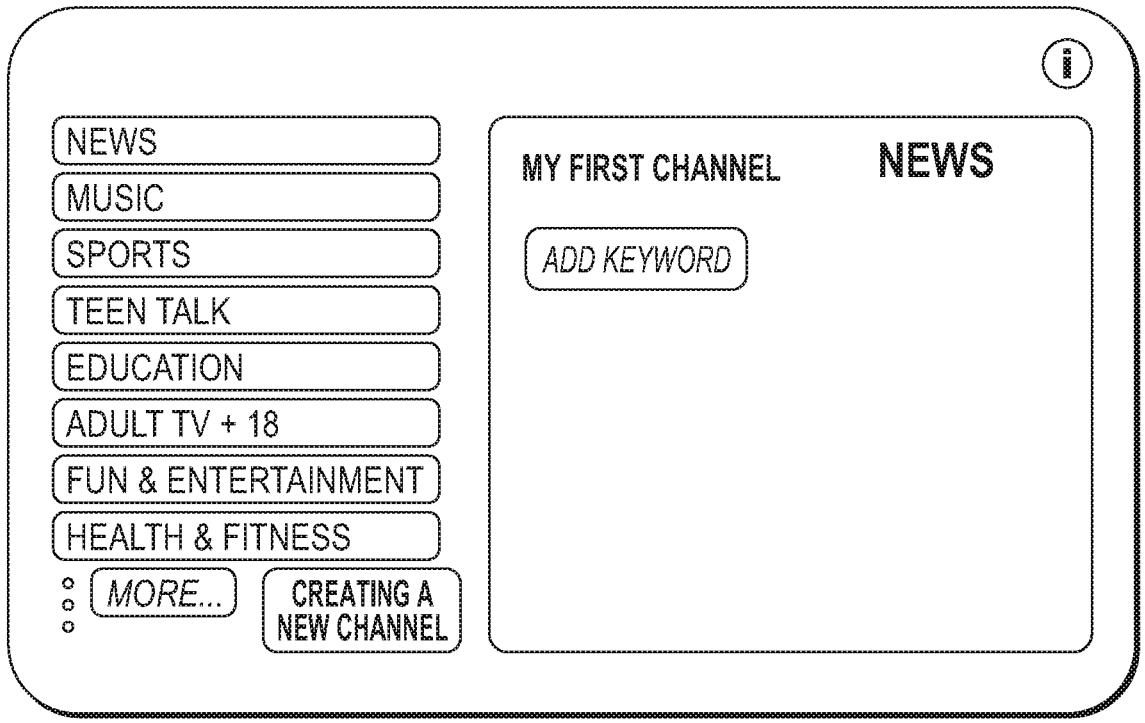
FIG. 8 shows an "add keyword" field that appears once the "additional parameter menu" in FIG. 7 has been completed.
Figure 9:
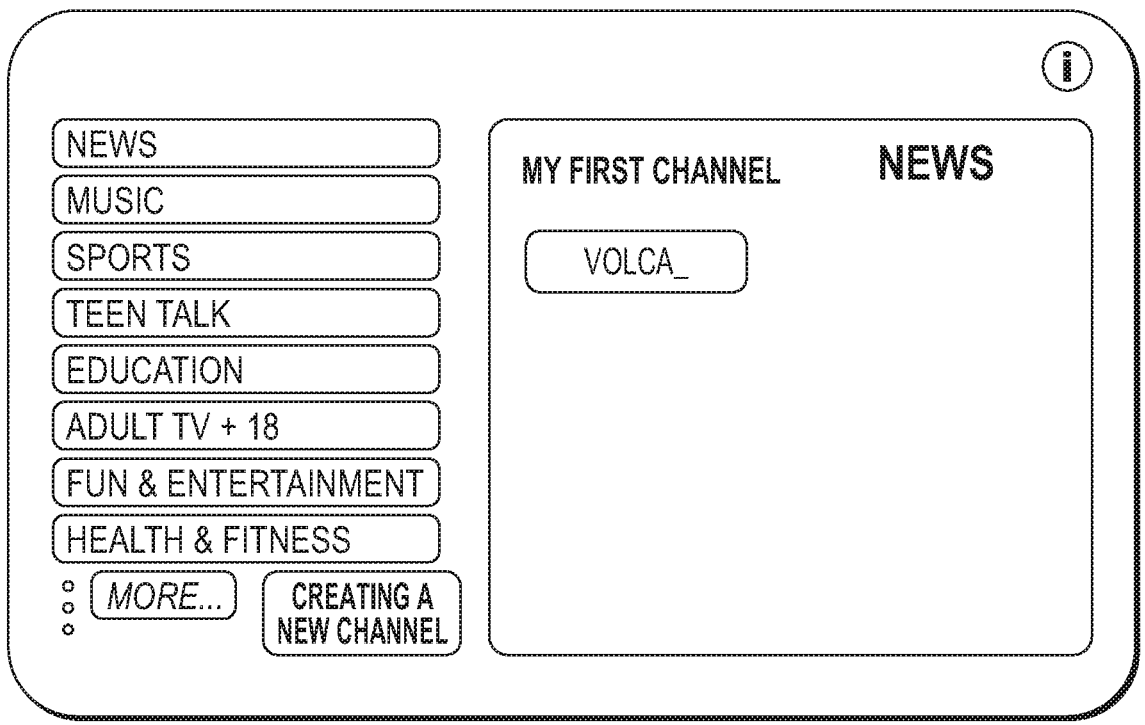
FIG. 9 illustrates filling the "add keyword" field.
Figure 10:
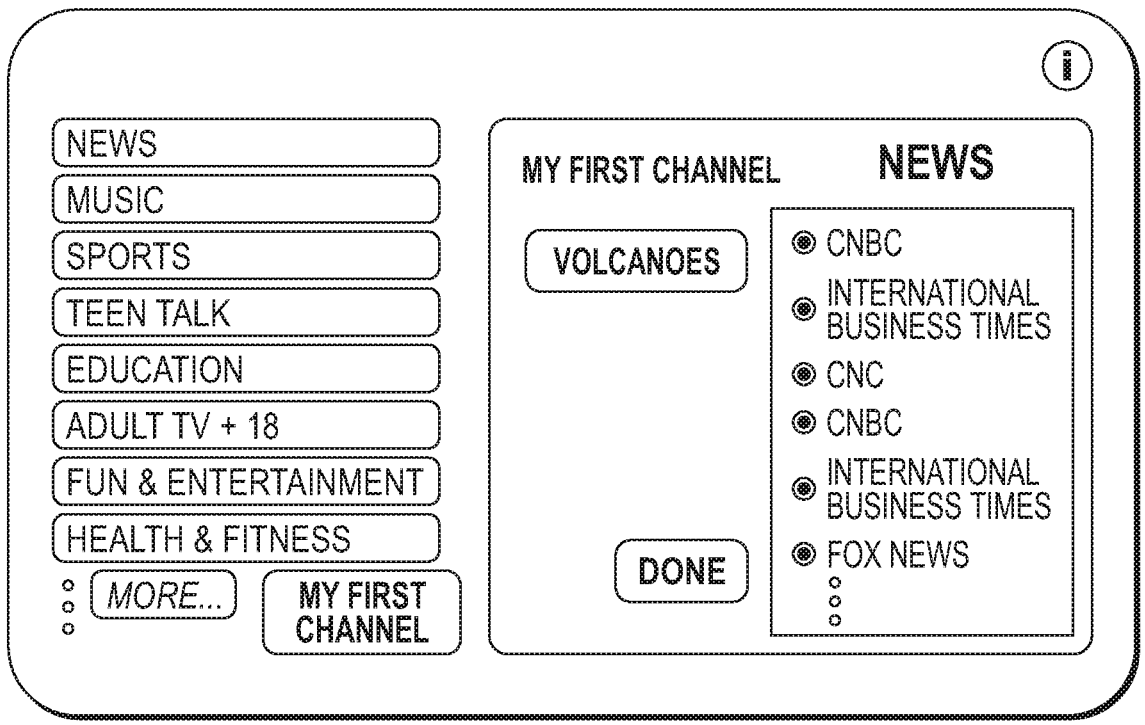
FIG. 10 illustrates a menu for selecting certain navigational parameters once the "add keyword" field has been completed.
Figure 11:
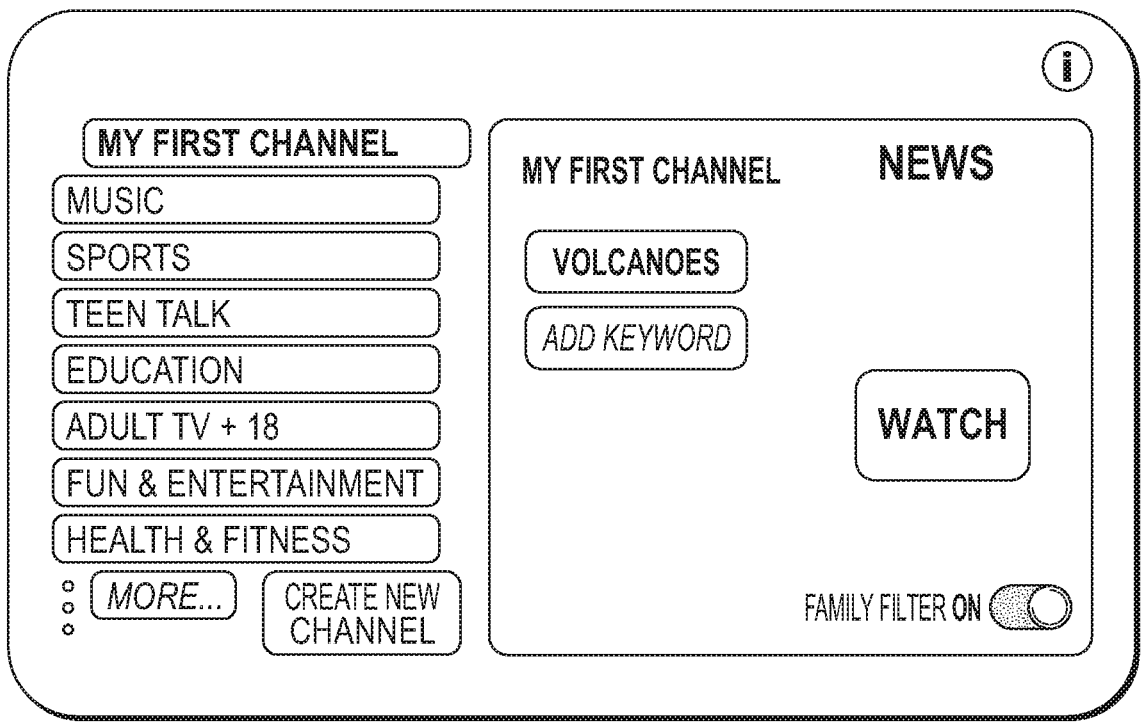
FIG. 11 illustrates a second "add keyword" field that appears once the "add keyword" field in FIG. 9 has been completed.
Figure 12:
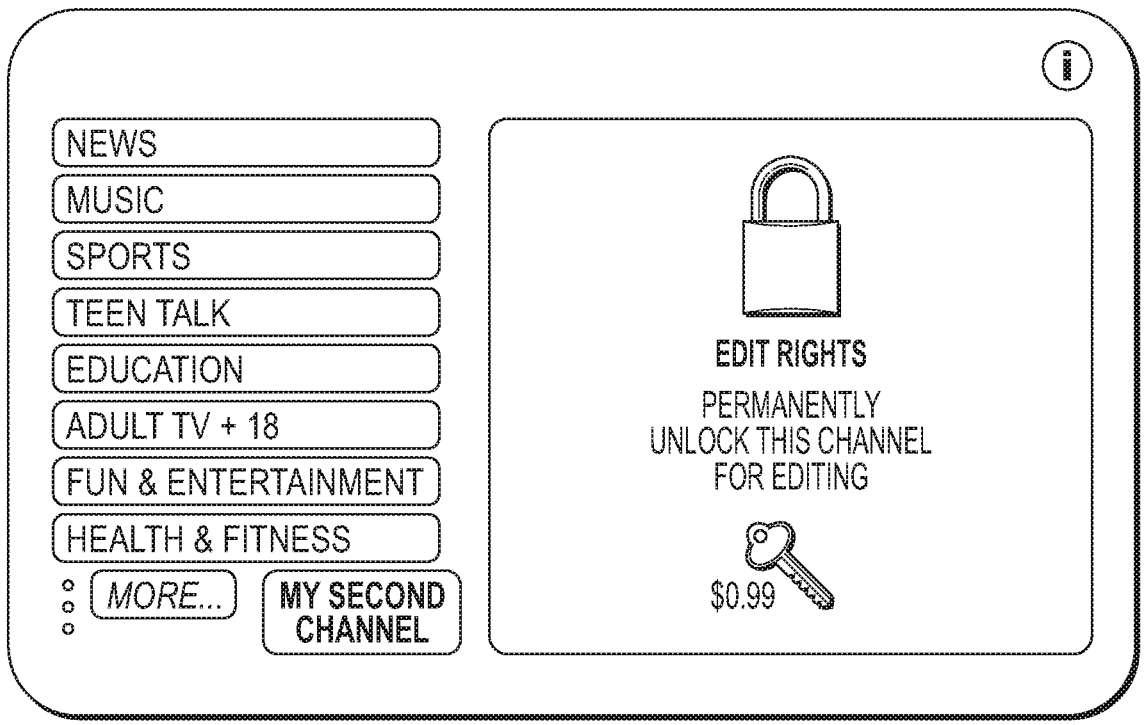
FIG. 12 illustrates a screen that appears for adding a second channel.
Figure 13:
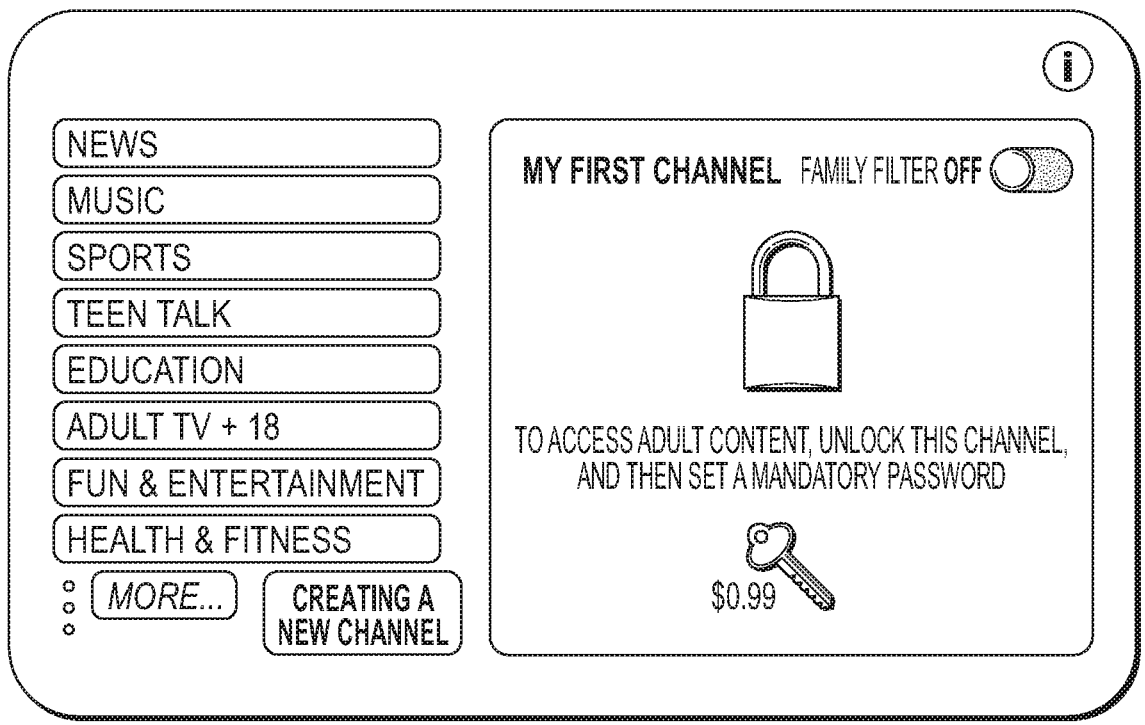
FIG. 13 illustrates a screen that appears for adding an adult channel.
Figure 14:
FIG. 14 illustrates an exemplary screen of a sponsor's advertisements.

FIG. 4 illustrates a screen in which the subcategories include navigational parameters. For example, for News—World—a user can select from CNBC, International Business Times, Vimeo, etc., for current or last 24 hours.

The system thus provides means for providing the personalized channels with a personalized name, and adding one or more additional limiting parameters consisting of key words and/or time to the query, as well as navigational parameters. See FIGS. 5 through 11.

Preferably, the queue plays automatically. More preferably, the queue is updated either periodically or as the source sites update.

In a further embodiment, a filter bubble is applied to customize the query results. One way in which this can be carried out is to provide the system with a skip function for a user to terminate play of a video and to automatically start play of the next video in the queue. The skip information is transmitted to the search engine. The filter bubble includes use of the skip function as a factor. The queue is preferably updated promptly after the skip button has been used.

While certain preferred embodiments have been described herein, the invention is not to be construed as being so limited, except to the extent that such limitations are found in the claims.

What is claimed is:

1. A method for receiving video information from the internet comprising providing a digital computer having a user interface, memory, a processor, internet access and software necessary for operability, displaying a menu on the user interface listing a plurality of categories of videos accessible to the computer from the world wide web using the internet access, upon selection by a user of a category of videos from the menu, querying, using the internet access, a web search engine for a list of video web page locations within the selected category, receiving the list at the digital computer by way of the internet access, forming the list into a play queue for the associated videos, receiving image and audio data for the videos in the queue using the internet access, and playing the videos at least partway through using the digital computer in the sequence in which they are queued up.

2. A method as in claim 1 wherein, after selection by the user of a category of videos from the menu, the user then enters a topic or at least one keyword of interest.

3. A method as in claim 2 wherein, the web search engine is queried for a list of video web page locations within the selected category matching the user specified topic or at least one keyword of interest.

4. A method as in claim 1 wherein said plurality of categories are arranged by subject matter.

5. A method as in claim 1 wherein the videos are played on the user interface.

6. A method as in claim 5 wherein the videos are played as streaming video.

7. A method as in claim 1 further comprising transmitting the image and audio data for the videos from the digital computer to a digital media player and playing the videos on the digital media player.

8. A method as in claim 7 wherein the videos are played as streaming video.

9. A method as in claim 1 wherein the order of the queue is based partly on date and time.

10. A method as in claim 1 further comprising
upon selection by a user of a category of videos from the menu,
displaying a second menu on the user interface listing a plurality of subcategories for the selected category of videos accessible to the computer using the internet access, and
upon selection by a user of a subcategory of videos from the menu,
querying, using the internet access, a web search engine for a list of video web page locations within the selected subcategory,
receiving the list at the digital computer by way of the internet access,
forming the list into a play queue,
receiving image and audio data for the videos in the queue using the internet access, and
playing the videos at least partway through using the digital computer in the sequence in which they are queued up.

11. A method as in claim 10 wherein the subcategories include navigational parameters.

12. A method as in claim 10 further comprising, prior to the step of querying, using the internet access, a web search engine for a list of video web page locations within the selected subcategory, adding one or more additional limiting parameters consisting of key words and/or time to the query.

13. A method as in claim 12 further comprising updating the queue.

14. A method as in claim 13 wherein the queue plays automatically.

15. A method as in claim 10 further comprising providing a skip function for a user to terminate play of a video and to automatically start play of the next video in the queue.

16. A method as in claim 15 further comprising applying a filter bubble to customize the query results.

17. A method as in claim 16 wherein the filter bubble includes use of the skip function as a factor.

18. A method as in claim 15 wherein the queue is updated when the skip button is used.

* * * * *